(No Model.)

F. P. COX.
ELECTRIC METER.

No. 542,240. Patented July 9, 1895.

WITNESSES
Henry O. Westendarp.
John M. Gibboney

INVENTOR
Frank P. Cox
By Geo. R. Blodgett
Atty

UNITED STATES PATENT OFFICE.

FRANK P. COX, OF LYNN, MASSACHUSETTS, ASSIGNOR TO THE GENERAL ELECTRIC COMPANY, OF NEW YORK.

ELECTRIC METER.

SPECIFICATION forming part of Letters Patent No. 542,240, dated July 9, 1895.

Application filed February 15, 1895. Serial No. 538,473. (No model.)

*To all whom it may concern:*

Be it known that I, FRANK P. COX, a citizen of the United States, residing at Lynn, county of Essex, State of Massachusetts, have invented certain new and useful Improvements in Electric Meters, of which the following is a specification.

The present invention relates to electric meters for indicating or recording the watts consumed in an electric circuit. It is applicable, therefore, to instruments which merely indicate watt consumption in an electric circuit at a given instant, as by a needle or pointer moving over a scale, or to instruments recording the total watt consumption, and commonly known as "recording watt-meters," having a number of dials and gear-driven pointers. It is particularly applicable to motor meters having a rotating armature, such as are shown and described in Patent No. 448,894, granted Elihu Thomson, in which coils in series with the work-circuit coact with other coils in shunt-circuit to produce rotation in an armature which is suitably damped or retarded, so as to drive a train of gearing at the proper speed to register the amount of energy consumed in the circuit.

The improvements of the present invention relate chiefly to arrangements of circuits adapting such instruments to constant current circuits, my object being to render the registry accurate, to provide special means for starting the motor into rotation under light load, and to keep the strength of the magnetic fields set up by the armature and that of the stationary inducing element so related as to compensate or correct errors in registry, which might otherwise be brought about by improper damping or regulation of the moving member, by friction, &c.

The invention further consists of a mode of regulating electric motor-meters to obtain a correct or very nearly correct registry for all conditions of load while permitting the windings to be modified to suit other conditions, as further explained hereinafter.

Figure 1:
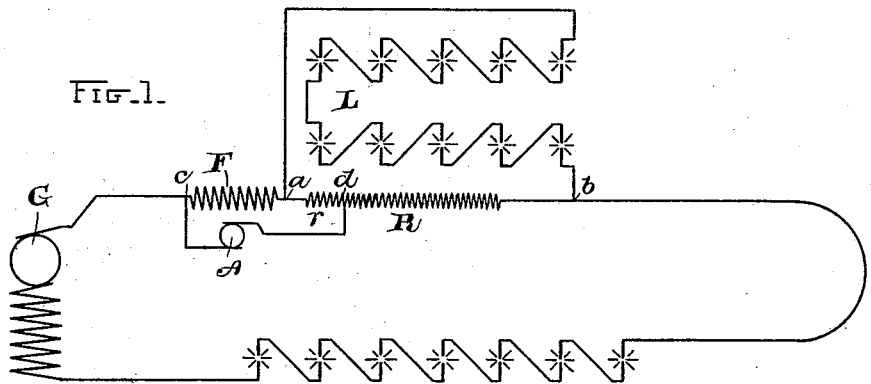
Figure 2:
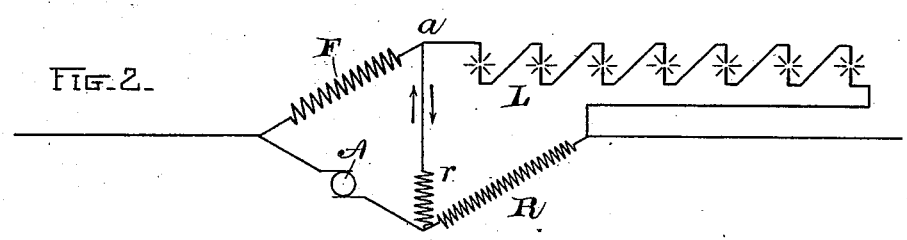
Figure 3:
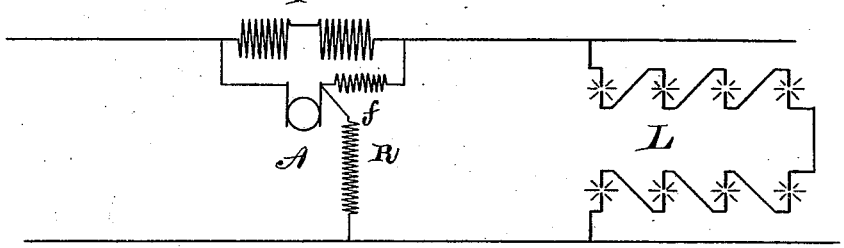
Figure 4:
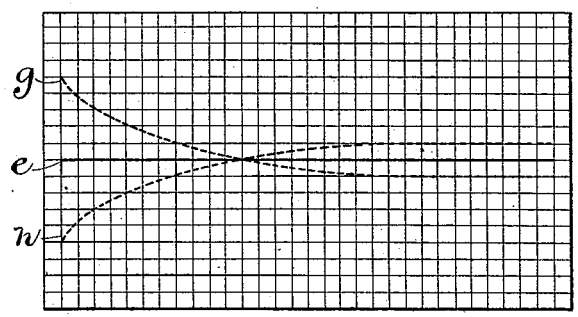

In the accompanying drawings, Figures 1 and 2 are diagrams of one form of the invention. Fig. 3 shows a somewhat different form, and Fig. 4 illustrates some curves explaining the regulating action of the motor.

In Fig. 1, G is a constant-current generator—as, for example, an arc-light dynamo. It may either be a direct or alternating current machine, according to the character of the consumption devices fed from the circuit.

L represents any desired kind of consumption devices, which are coupled in series and are designed to work properly with a current of constant strength.

Assume, for example, that the group L, Fig. 1, consists of a number of arc lamps, the energy consumed in which is to be measured and recorded. F represents the field-winding of an electric motor-meter coupled in series with the consumption devices. The armature A of the motor shunts the field-winding, and one terminal is connected to a point in a resistance shunting the translating devices. This resistance may be regarded as composed of two resistances, and, indeed, two resistances may be used. That between the points $a\ d$ is lettered $r$, and that between the points $b\ d$ is lettered R. The arrangement is perhaps more clearly shown in Fig. 2, where it will be seen that the field-coil F and the consumption devices L correspond with one side of a Wheatstone bridge, the armature A and resistance R form the other side of the bridge, while the resistance $r$ corresponds in position with the bridge wire or galvanometer in the bridge. With this arrangement the current in the field-coil F is of constant strength, or very nearly so, while the current in the armature will depend upon the number of translating devices in use, or, in other words, upon the potential difference around the group of translating devices, which, of course, will be greater when all the lamps are in use, and vice versa. In meters of this description, working in constant potential circuits, a starting-coil has been used for furnishing a field, overcoming the effects of friction in the motor and enabling it to start up under light load. This starting-coil is usually connected in shunt to the mains, and the current in it therefore depends only on the potential between the mains. A different arrangement is, however, required on a constant-current circuit. In such cases it has been proposed to make the main field-coil depend for current upon the translating devices and to put the armature in the main line or a shunt around a resistance in the main line. In such cases the auxiliary field-coil for balancing friction has been placed in multiple with an armature or in shunt to some constant resistance in the main line. The present arrangement I consider a much better one, avoiding a number of objections incident to that heretofore employed.

Assume, for example, that all the lights L are short-circuited. Then there will be practically no potential difference between the points $a$ $b$, Fig. 1. Between the points $a$ $c$—that is, around the series coil F—there continually exists a potential difference due to the resistance of the coil. Hence, a fraction of the current will be diverted through the armature A and the resistance $r$. The resistance of the coil F is so selected that the current in A, acting with that in F, will give the armature a torque sufficient to balance the friction of the armature-shaft in its jewel-balance. Now, let one lamp be turned on. Immediately there is a potential difference between the points $a$ $b$ of, say, thirty to forty-five volts, and there results an increase of current through the resistance R and the armature A, increasing the speed of the latter in accordance with the number of lamps added from time to time. By properly damping the motion of the armature in any of the well-known ways a reading may be obtained on the registering mechanism proportionate to the work done.

After a certain load is on the meter it is not essential that the magnetic field set up to overcome friction be maintained, and by the construction shown the current which originally passes through $r$ is gradually decreased, and actually reverses its direction.

Referring to Fig. 2, no current will flow through $r$ when $a$ $d$ are equal potential points—that is, when $$F:L::A:R \text{ or } L=\frac{FR}{A}.$$

When the resistance of the lamps L becomes lower than this, the armature-current divides, part passing through R and part through $r$. When the resistance is higher, the whole armature current, plus the current in $r$, passes through R. It is important that the resistance of $r$ should be great, relatively, to that of the armature A, in order that nearly the entire current in the resistance R should pass through the armature and not through $r$. The current in $r$ may be considered as waste, and therefore should be as small as practicable.

In view of the change in direction of the current through the winding $r$ under different conditions of load, in many cases it is desirable to utilize this winding as an auxiliary field-coil, as shown at $f$, Fig. 3. The field-coil, considered as a resistance, will act as before explained. It will be so connected in circuit that the field it induces assists in turning the armature when the load is light—that is, it assists in overcoming the friction of the instrument. As the load increases, the effect of this field constantly diminishes, until it becomes zero. Then the current reverses and the field acts to oppose the rotation of the armature to an amount increasing with the load. This becomes useful in some cases in regulating the meter. For instance, in metering alternating currents it is desirable to have the armature-turns as few as possible, in order that the current induced in them shall have a low potential, as the coils are successively short-circuited under the brushes and a tendency to sparking exists at this point. These currents are due to the field-coils acting as a primary winding to a short-circuited secondary. By using the field-coil, which it first assists and afterward has no influence on, or even opposes the rotation of the armature, it is possible to use an armature-winding with few turns and assist in overcoming friction by coil $f$, Fig. 3. It then becomes necessary to select or adjust the damping or regulating mechanism so as to act suitably, as illustrated in Fig. 4. Here the curve $h$ represents the reading of the meter when the armature is acted upon solely by the coil F, as in Fig. 1. The curve $g$ represents the effect of the coil $f$, Fig. 3, and the straight line $e$, which is the resultant of $g$ and $h$, indicates the correct registry thus obtained. It is possible to so adjust the effect of the coil $f$ that it never opposes rotation of the armature, but in this case it is necessary, of course, to alter the damping mechanism correspondingly, in order that the resultant of the curves $g$ and $h$ shall continue to give the straight line $e$.

What I claim as new, and desire to secure by Letters Patent of the United States, is—

1. The combination of a constant current circuit, with a meter motor having a field winding in the main line, and its armature shunting the field through a resistance, so graduated in amount as to give a starting torque sufficient to overcome friction.

2. The combination of a constant current circuit, having a resistance in shunt to the translating devices, or any desired portion of them, and a meter with a stationary inducing winding in the main line, and an armature winding shunting the inducing winding and connected at one terminal to an intermediate point in the resistance.

3. The combination of a constant current circuit with a meter motor coupled in circuit, with the field winding and translating devices forming one side of a Wheatstone bridge, the armature and a resistance the second side of the bridge, and a resistance corresponding to the bridge wire adjusted to give a starting torque to the motor, as set forth.

4. The combination of a constant current circuit, with a meter motor having a main field winding in the main line, an armature shunting the field winding and the translating devices through a resistance, and an auxiliary field winding wound so as to enhance the starting torque of the motor, and connected between the main field winding and the translating devices, as set forth.

5. The method of operating an electric meter, consisting in establishing an initial starting torque for overcoming the friction of the moving element of the meter and gradually diminishing, or removing, said torque as the load comes on.

6. The method of operating an electric meter, consisting in establishing, besides the normal operating torque of the meter, an extra torque for overcoming the friction of the moving element thereof under light load conditions, removing said compensating torque, and afterward establishing a torque opposing the motion of the moving element of the meter.

In witness whereof I have hereunto set my hand this 13th day of February, 1895.

FRANK P. COX.

Witnesses:
JOHN W. GIBBONEY,
HENRY O. WESTENDARP.